United States Patent [19]

Pardee

[11] 4,203,856
[45] May 20, 1980

[54] LUBRICANTS COMPRISING FLUOROALKYL ESTERS

[75] Inventor: Robert P. Pardee, Boulder, Colo.

[73] Assignee: Ball Corporation, Muncie, Ind.

[21] Appl. No.: 924,025

[22] Filed: Jul. 12, 1978

Related U.S. Application Data

[63] Continuation-in-part of Ser. No. 824,886, Aug. 15, 1977, abandoned.

[51] Int. Cl.² .................... C10M 3/24; C10M 7/28; D02G 3/00; H01F 1/00
[52] U.S. Cl. .................... 252/54.6; 252/58; 427/371; 427/384; 428/900
[58] Field of Search .................. 252/54.6, 58; 428/900; 427/371, 384

[56] References Cited

U.S. PATENT DOCUMENTS

| | | | |
|---|---|---|---|
| 2,840,593 | 6/1958 | Sommers et al. | 252/54.6 |
| 3,004,061 | 10/1961 | Baer et al. | 252/54.6 |
| 3,124,533 | 3/1964 | Metro | 252/54.6 |
| 3,490,946 | 1/1970 | Wolff | 428/900 |
| 3,752,847 | 8/1973 | Fletcher | 252/54.6 |

FOREIGN PATENT DOCUMENTS 911061  11/1962  United Kingdom .................... 252/54.6

*Primary Examiner*—Irving Vaughn
*Attorney, Agent, or Firm*—Gilbert E. Alberding

[57] ABSTRACT

An article of manufacture and a method are disclosed herein for improving lubricity and wear resistance of a given substrate by applying thereto a solution comprising a fluoroalkyl ester and an organic carrier. The compositions herein disclosed have been found to be most effective as preservatives for coating sundry substrates, especially gramophone or phonograph record surfaces whereby there is effected a reduction of record groove wear while substantially reducing the friction between the stylus and the record groove. A preferred composition herein contemplated and disclosed is one comprising a perfluoroalkyl ester of stearic acid and a halogenated hydrocarbon carrier.

20 Claims, No Drawings

LUBRICANTS COMPRISING FLUOROALKYL ESTERS

This is a continuation-in-part application of U.S. Pat. Ser. No. 824,886, filed Aug. 15, 1977 abandoned.

BACKGROUND OF THE INVENTION

1. Field of the Invention

The present invention pertains generally to lubrication of substrates and, more particularly, to an improved lubrication composition, methods of application and articles resulting from the implementation of such methods. The improved, wear-resistant, low friction substrates result from simply treating said substrates with the composition of the present invention. Although a wide variety of substrates can be treated with the composition of the invention, special substrates having recordings thereon or capable of having recordings thereon are particularly contemplated. Such substrates include computer recording discs, magnetic recordings, photographic projection film such as moving picture film, slide film, and microfilm as well as sound and video recordings such as gramophone or phonographic records, video discs and the like.

2. Description of the Prior Art

Sound recording media have been extensively used for some years in at least three major fields, namely, in the manufacture of phonograph records, in recording media in dictating machines wherein they may be in the form of endless belts, sheets, discs and in other forms, and in the computer system field to record data in various plastic coated surfaces in the form of drums, discs and the like.

Lubrication of the various media, and, particularly substrates upon which recorded signals have been stored and from which said signals can be recalled by dynamic means, has not been generally recognized as a straightforward act. Where attempts have been made to lubricate such substrates, they have not proven fully satisfactory. In particular, substrates possessing this special problem include synthetic, natural and combinations of thermoplastic materials and include resins, shellac, polyvinyl acetate, polyvinyl chloride, cellulose acetate, cellulose nitrate, polyvinyl benzene, and their derivatives. Numerous other compositions are contemplated and especially those which are generally formed through various press moulding means into phonographic records or discs as well as similar thermoplastic structures having trackable, helical groove contours thereon, which when used in conjunction with certain dynamic means such as styli are capable of following said contours thereby reproducing recorded monaural and stereophonic and video signals.

As is generally known, a phonograph cartridge serves to convert the variations on the walls of the grooves of a phonograph record into electrical signals whereby the variations or wavy pattern on the grooves determine the frequency and the amplitude of the sound vibrations. The cartridge includes a stylus or pickup needle, usually in the form of a diamond or sapphire, which generally has a hemispherical or ellipsoidal tip which rides or dips into the record groove and moves in response to variations of the pattern of said groove. The stylus, in turn, is generally attached to an armature which moves with the stylus to induce variations in an electrical or magnetic field in response to the stylus movement. This generates an electrical signal representative of the groove configuration which may then be amplified and used to drive speakers. Again, the stylus is caused to mechanically vibrate in response to the variations in amplitude and frequency of the undulations of the record groove wall which comprises the recorded signal.

A stylus has to track a plurality of evenly spaced groove contours with recorded signals on the order of between 15–20 and 20,000 Hz. Moreover, with the introduction of discrete four-channel record systems or quadrasonic systems, a stylus must faithfully track grooves with recorded signals to cause vibrations of up to 50,000 Hz. As the stylus rides in the record groove, the relatively hard stylus wears away the relatively soft thermoplastic material of the record forming the groove. There has been heretofore no easy solution to alleviate the problem of record wear caused by the stylus riding in the groove contour of such recordings.

The deterioration of the sound quality of records with increase in the number of plays through wear of their tracks results in records becoming unusable and often being discarded within a short period of time. A number of factors are responsible for wear including the general wear through abrasive and adhesive wear mechanisms to an extent proportional to stylus loading. This loading is not only the deadweight stylus load on the record which may range from about 1 gram to 4 grams but also includes dynamic inertial forces caused by stylus mass and the frequency of stylus directional changes as it tracks the groove undulations. As known, reduction of deadweight load and stylus mass lowers the rate of groove wear, but wear and the consequent loss of playback fidelity cannot be entirely eliminated. At any rate most attempts of the prior art via record cleaners or alleged lubricants have simply resulted in cleaning only or depositing chemical films onto records without being successful, in that such materials generally reduce the record fidelity due to rapid groove wear, if cleaned, or to hydrodynamic damping of the stylus tracking, if oily substances are deposited. Further, it is often observed in the use of these materials that the noise level is increased due mainly to dust captured along with the formation of a tacky deposit upon the stylus. Moreover, it has been observed that attempts to use powdered solid lubricants such as graphite, molybdenum disulfide and the like have several disadvantages for they do not only reduce the fidelity, but they also increase noise due to particulate interference in the record grooves.

In general, various graphites, silicones and hydrocarbon waxes and certain fluorinated telomeric compositions have been used as lubricants in sundry applications. U.S. Pat. No. 1,247,232 discloses the use of graphite as a lubricant for phonograph records. Further, U.S. Pat. No. 2,804,041 to Cousino relates to the use of colloidal graphite in a fluorocarbon carrier for use on magnetic coatings.

U.S. Pat. Nos. 3,067,262 to Brady and 3,345,424 to Hauptschein et al., discuss the manufacture of fluorinated telomers. In particular, U.S. Pat. No. 3,067,262 to Brady discloses tetrafluoroethylene telomerized with trichlorotrifluoroethane whereby moderately high molecular weight products are produced. The patent discloses further that in order to obtain a wax-like product, a second active telogen must be included in the telomerization process. In general, such active telogens are hydrogen-containing compounds including tertiary hydrocarbons, aliphatic alcohols, divalent sulfur compounds, aliphatic tertiary amines, aliphatic ethers, carbonyl compounds and dialkyl phosphites. Since these active telogens contain hydrogen, the telomer products contain significant amounts of hydrogen, e.g., from 0.05 to 2% by weight.

U.S. Pat. No. 3,345,424 to Hauptschein et al., discloses an improvement over the telomeric compositions of U.S. Pat. No. 3,067,262 in that the improved compositions have no hydrogen and are of a lower melting point. In effect, the improved compositions are derived from the products obtained by telomerization of tetrafluoroethylene with certain haloalkanes. In fact, the compositions are made by the chlorination or fluorination of certain fractions of telomer iodide mixtures whereby the iodine is replaced by chlorine or fluorine. The utility of these compositions is found in their application as a general dry lubricant, protective surface treatment, oil and water repellents, and a mold release and anti-stick composition.

In U.S. Pat. No. 3,398,011 to Neirotti discloses a method of compressive rolling a lubricant such as low-solubility fluorinated solid compounds in an organic carrier onto magnetic record members.

U.S. Pat. No. 3,490,946 to Wolff discloses the use of fluorocarbon compounds including fluorocarbon esters as lubricants for magnetic record elements.

In U.S. Pat. No. 3,652,314 to Castner, a method is disclosed for renewing, resurfacing and preserving a phonograph record by the steps of coating the record with a composition consisting essentially of acrylic polymer, polyethylene emulsion, a detergent, an ether and water, brushing the composition into the grooves, removing any excess, drying and playing the phonograph record.

U.S. Pat. 3,704,152 to Hartmann relates to the use of small amounts of a liquid mixture of branched fatty acids for magnetic recording media.

In U.S. Pat. Nos. 3,862,860, 3,954,637 and 3,998,989 to Pardee et al., a method, article and composition are disclosed for improving lubricity, abrasion resistance, and lowering the coefficient friction of substrates such as photographic films, magnetic surfaces and other recording elements by applying to such substrates a solution comprising tetrafluoroethylene telomer and a copolymer of vinyl chloride and trifluorochlorcethylene in a volatile solvent, drying and removing the excess, and substrates so lubricated. In effect it was shown that the combination of a lubricant, viz., tetrafluoroethylene telomer and non-lubricant, viz., poly(trifluorochloroethylene-covinyl chloride) provides a coefficient of friction below that of the lubricant per se.

Further, U.S. Pat. Nos. 3,951,841 and 3,965,520 to Maier relate to cleaning compositions for phonograph records comprising an aqueous system of nonionic surfactant, glycol-type emulsifiers, an alcohol, and a fungicide.

U.S. Pat. No. 4,034,133 to Fleck et al., relates to lubricants for magnetic recording media, the lubricant being a trifluoride of cerium, lanthanum, praseodymium, neodymium and samarium.

SUMMARY OF THE INVENTION

This invention is founded on the discovery that certain fluoroalkyl esters are extremely effective lubricants upon sundry substrates and especially upon those substrates having dynamic presentations thereon, such as phonograph records, discs, recording tapes and the like.

The term "substrate" as used herein embraces various surfaces of articles to be treated by the compositions and refer to plastic substrates, metal substrates, combination of plastic and metallic substrates, and in particular to playing elements of synthetic, natural and combinations of thermoplastic materials and include resins, shellac, polyvinyl esters such as polyvinyl acetate, polyvinyl benzene, polyvinyl chloride, cellulose acetate, cellulose butyrate, cellulose nitrate, their derivatives as well as copolymers and blends thereof. In particular, the term "substrates" include those surfaces which are made of numerous compositions that are generally formed through various press molding means into phonographic records or discs as well as similar thermoplastic structures having a trackable, encoded groove thereon which when used in conjunction with certain dynamic means such as styli are capable of following said groove and reproducing recorded monaural and stereophonic and video signals therefrom.

In particular, the present invention, which provides a wear-resistant lubricous coating for sundry substrates, comprises a solution of a fluoroalkyl ester and a carrier for said fluoroalkyl ester. The composition can be easily applied to any number of the aforementioned substrates and especially to thermoplastic substrates as generally used in the record or gramophone trade upon which are recorded signals in the form of undulations or grooves, the composition herein providing a coating or film that provides a marked increase in lubrication and wear properties thereof.

Accordingly, an object of the present invention is to provide a method which produces a substrate having low, effective friction characteristics.

Still another object of the present invention is to provide a dry coated record surface having long life, great wear resistance and low surface friction.

Another object of the present invention is to provide a composition and method which impart abrasion resistance to substrates, especially thermoplastic surfaces, through a protective coating that will withstand certain loads.

An object of this invention is to provide a method and phonograph record article or similar plastic substrate having a greater extension of its playing life.

Another object of the present invention is to provide a composition and method which impart wear resistance to phonograph elements through a dry protective coating capable of bearing a momentary load without any significant reduction in playing functionalities after a substantial number of plays.

Another object of this invention is to produce a treated phonograph record, tape or disc which after a large number of plays does not result in any substantial wear or particle build-up thereon.

Yet still another object of the present invention is to provide a recording surface having both high lubricity and low noise characteristics.

A further object of the present invention is to provide an improved, thin lubrication system for groove-tracking record elements having recorded audio and/or video signals stored thereon and which can be subjected to dynamic tracking means to render the signals recorded thereon.

Another object of this invention is to provide an effective lubricating composition that has penetrating ability as to its distribution of lubricant within the fine grooves and tiny crevices associated with records and other substrates or the like which are capable of having or have dynamic presentations thereon.

These and other objects of the present invention will become apparent from the following description and discussion.

DETAILED DESCRIPTION OF THE INVENTION

The compositions of the present invention which impart to a given substrate a low coefficient of friction and wear-resistant properties, the compositions comprising a solution of a fluoroalkyl ester in a carrier or solvent therefor. In general, the fluoroalkyl esters may be esters of monocarboxylic acid, viz., the fluoroalkyl monoesters; the esters of dicarboxylic acid, viz., the fluoroalkyl diesters; esters of tricarboxylic acid, viz., the fluoroalkyl triesters; and esters of tetracarboxylic acid, viz., the fluoroalkyl tetraesters. Herein the fluoroalkyl esters are compounds derived from carboxylic acids by replacing the ionizable hydrogen atom by a fluoroalkyl radical.

The fluoroalkyl portion of the molecule is the alcohol moiety thereof and has generally from about two to about twenty carbon atoms. The preferred fluoroalkyl monocarboxylic acid esters are fluoroalkyl acetate, fluoroalkyl laurate and fluoroalkyl stearate; the preferred fluoroalkyl dicarboxylic acid esters are fluoroalkyl malonate and fluoroalkyl azelate; and the preferred fluoroalkyl tricarboxylic acid ester is fluoroalkyl citrate. These fluoroalkyl esters can be readily prepared by conventional chemical techniques known in the art. In general, the fluoroalkyl monoesters may be produced by condensation of fluoroalcohols with aliphatic monocarboxylic acids. Further, fluoroalkyl polyesters may also be readily produced by the reaction of fluoroalcohols with polycarboxylic acids, either of the aliphatic or aromatic type. Mixed esters are also readily produced such as those formed from the condensation products of pyromellitic anhydride with a mixture of fluoroalcohols.

The esters herein contemplated embrace those esters of terminally fluorinated alcohols in which a bridge containing an alkylene group is interposed between the fully fluorinated portion and the ester linkage. It is understood that the fluorinated alcohol may be a branched as well as a straight chain moiety.

In particular, the fluoroalkyl esters used in accordance with this invention may be readily prepared from the perfluoroalkyl aliphatic alcohols (viz., 2-perfluoroalkyl alkanols) of the formula $C_nF_{2n+1}(CH_2)_mOH$ where n is from about 3 to 14 and m is 1 to 3 and the corresponding carboxylic acid by art-known procedures. For example, esterification reaction may be readily carried out by using para-toluenesulfonic acid or sulfuric acid as a catalyst with the alcohol and carboxylic acid in benzene and heating these ingredients, removing the water of reaction by codistilling with the benzene and thereafter removing any residual by distillation to isolate the given esters. The perfluoroalkylethanols may be prepared by hydrolysis of fluoroalkyl hydrogen sulfates which in turn are produced from the reactions of perfluoroalkylethyl iodides with oleum, these reactions being described in U.S. Pat. No. 3,283,012. Also, the perfluoroalkylethyl iodides may be prepared by known reactions of perfluoroalkyl iodide with ethylene as described in J. Chem. Soc. 2856 (1949) and J. Chem. Soc. 2789 (1950) as well as by known telomerization reactions described in U.S. Pat. Nos. 3,132,185 and 3,234,294. Conventional separation technique may be employed to isolate selected fractions as, for example, the corresponding iodides having the perfluoroalkyl moiety in the range of 6 to 14 carbon atoms may be separated by distillation as set forth in U.S. Pat. No. 3,716,401.

The fluoroalkyl esters may generally be mixtures which can, if desired, be further refined by fractional distillation or chromatographic techniques. Nonetheless, the esters may cover a somewhat broad range, for example, a common fluoroalkyl ester such as fluoroalkyl malonate may generally be a mixture of esters having an average of about 70% to 80% perfluorohexyl to perfluoroheptyl-containing esters, with esters having a perfluorobutyl moiety and lower, less than about 5% and a perfluorodecyl moiety and higher, making up the balance.

The monocarboxylic or polycarboxylic acids herein contemplated that form the acid portion of the ester may contain from about 2 to 30 carbon atoms. Examples of such acids include citric acid, azelaic acid, stearic acid, adipic acid, malonic acid and acetic acid.

The carriers utilized with the compositions of the present invention are essentially organic and are generally halogenated. The penetrating ability or penetration coefficient of a given carrier is critical for proper and effective distribution of lubricant within the fine grooves and tiny crevices of a phonograph record, media, substrate or the like having dynamic presentations thereon. For example, record grooves are generally closely spaced, V-shaped crevices having an opening of about 0.003 inch (7.6 microns) with a bottom radius of often equal to or less than 0.002 inch (5.1 microns). In order to get within the grooves of the sound track the carrier itself must exhibit a high penetration ability, a property apparently depending on a number of factors including surface tension, viscosity, volatility, etc. Seemingly, carriers found most effective for this purpose are those that have surface tensions of less than about 20 dynes per centimeter (20° C.). While certain carriers are useful, provided there is no adverse effect upon the substrate, trichlorotrifluoroethane is particularly desirable carrier as having a high penetration coefficient, suitable organic dissolution powers, high volatility, and essentially no physical or chemical effect on the substrate. The trichlorotrifluoroethane can be either isomer, i.e., it may be 1,1,1-trichloro-2,2,2-trifluoroethane or 1,1,2-trichloro-1,2,2-trifluoroethane.

Certain other organic carriers or cocarriers may also be incorporated with the preferred carrier of trichlorotrifluoroethane to the extent that the combination has no more adverse effect on the aforementioned properties as well as the substrate than does trichlorotrifluoroethane alone. Suitable cocarriers that may be incorporated with the trichlorotrifluoroethane include, for example, 1,1,1-trichloroethane, benzotrifluoride, perfluorodimethylcyclobutane, acetone, hexane, chloroform, tetrachloroethylene, trichloroethylene, methyl ethyl ketone, methylene chloride, carbon tetrachloride, trichloroethylene, dichloroethylene, dichloroethane, and mixtures thereof.

The esters herein contemplated are those that are soluble in the aforementioned organic carriers and for the most part do not exist in the compositions hereindescribed as particles or as colloidal suspensions. In effect, the compositions of the present invention are generally essentially clear, homogeneous solutions, that is, each exhibits a uniform composition throughout its entire volume without any turbidity.

A preferred composition of the present invention is one comprising fluoroalkyl stearate wherein the fluoroalcohol portion of the ester has from four to seventeen carbon atoms. The preferred carrier is trichlorotrifluoroethane.

Lubrication of substrates herein contemplated can be accomplished by applying the herein-described composition wherein the fluoroalkyl esters are generally present in an amount less than three weight percent to a given substrate, evaporating the solvent therefrom, and lightly buffing, if desired, the thus-coated substrate to provide a clear dry coating. Application of the composition can be accomplished by numerous means including spraying, dipping, brushing, swabbing, flowing and doctoring. For most purposes, spraying and swabbing are preferred because of the complete and uniform coverage these methods afford.

There may be added to the compositions of the present invention minor amounts of various conventional components including antistatic agents, antioxidants, fungicides, germicides, pigments, hardeners, fillers, binders, odorants, dyes and the like if there is need to do so and to the extent that such ingredients are soluble or dispersible in the carrier and do no degrade the performance characteristic of the present invention.

The fluoroalkyl esters herein contemplated and disclosed may be employed in amounts ranging from about 3.0 to about 0.001 weight percent based on the total weight of the mixture, prefereably from about 0.2 to about 0.01 weight percent and especially from about 0.1 to about 0.03 weight percent. The resulting treated article which also forms a part of this invention is made by applying the compositions to the surface and removing the carrier therefrom whereby there is deposited thereon a coating of said fluoroalkyl ester ranging from about 0.3 to 3 micrograms per square centimeter.

Treatment of the various substrates herein contemplated can be accomplished by applying the above-described compositions in a concentration generally less about three weight percent, evaporating the carrier therefrom to provide a coating or film thereon which comprises essentially the non-volatile fluoroalkyl ester. In practice a concentration of between about 0.1 and 0.03 weight percent has been found to be satisfactory for treating phonograph records. Further, it has been found advantageous to buff or polish after treatment to impart a good luster to the playing surface thereof.

There will be illustrated herein preferred examples of the lubricating compositions of this invention and method of using the same. The specific illustrations, however, are not intended to be a limitation upon the breadth of the invention. Generally, the invention taught herein is one in which a volatile but effective carrier transports therein an essentially non-volatile material, viz., a fluoroalkyl ester, the latter forming a film upon a given substrate after the carrier has volatilized.

EXAMPLE I

A solution was prepared comprising 99.96 percent by weight of trichlorotrifluoroethane (Freon TF) and 0.04 percent by weight of perfluoroalkyl citrate (this triester is available under the trademark Zonyl TBC from E. I. du Pont de Nemours & Co., Wilmington, DE.), the average perfluoroalkyl moiety thereof ranging from heptyl to octyl. A clear homogeneous solution resulted and was sprayed onto a clean phonograph test record, National Association of Broadcasters (NAB) test record No. 12-5-98, the trichlorotrifluoroethane was allowed to evaporate, and the playing surface was lightly buffed to leave a thin coating of said ester thereon.

A stylus/groove coefficient of friction test was conducted on the phonograph record before and after the treatment described by measuring the change in the deceleration rate of the freely rotating phonograph record on a turntable, the deceleration change being caused by the engagement of the tone arm stylus with the record groove. This change in deceleration is converted to stylus/groove coefficient of friction by the following formula:

$$f = \frac{I_t(A_t - A_b) \sin 45°}{SR}$$

f = coefficient of friction.

$I_t$ = moment of inertia of total rotating system.

$A_t$ = angular deceleration for the total effects of stylus and turntable bearings.

$A_b$ = angular deceleration for the effect of the turntable bearings alone.

S = stylus force on record.

R = mean record radius at groove where stylus is sliding.

Using the above formula the coefficient of friction before coating with the aforementioned citrate composition was 0.35 and after application of said composition the coefficient of friction was reduced to 0.18.

Another composition was prepared as above with the exception that 0.04 weight percent fluoroalkyl stearate was used in place of the aforementioned citrate, this monoester being available from E. I. du Pont de Nemours & Co., Wilmington, DE. The average perfluoroalkyl moiety of said monester ranged from heptyl to octyl. The coefficient of friction of the untreated record was 0.33 where the treated record with the fluoroalkyl stearate gave a coefficient of friction of 0.11.

EXAMPLE II

Accelerated phonograph record wear tests were conducted on NAB test records which had been treated with the compositions hereinafter disclosed. The results achieved from cleaned and treated records were compared with the results of the wear test conducted on a cleaned test record which had not been treated in accordance with the present invention. A graduated scale was established ranging from a rating of zero for a clean, mint condition appearance to a rating of 100 for a surface heavily covered with wear debris. The test utilized a standard type automatic record turntable rotating at 33⅓ rpm with the stylus on the tone arm adjusted to 9.5 grams load on the record surface. This high stylus load was used in order to accelerate the wear process and thereby provide better discrimination among record treatments. Various compositions of the present invention were applied to the record surfaces in accordance with the procedure described in Example I. Test results after 125 to 127 playing cycles are presented in the tabulation below:

| Phonograph Test Record Identification | Composition of Record Treating Solution: Trichlorotrifluoroethane plus the following (wt.%) | Record Surface Appearance at Test Termination and Relative Rating |
|---|---|---|
| A | 0.04 wt. % fluoroalkyl citrate (average perfluoroalkyl portion 7 to 8 carbon atoms) | Relatively clean surface --scattered fine wear particles: Rating = 15 |
| B | 0.04 wt. % fluoroalkyl stearate (average perfluoroalkyl portion 7 to 8 carbon atoms) | Quite clean: scattered very fine particles: Rating = 7 |
| C | Control Record (Record cleaned via mild detergent) | Heavily covered with various sizes particles of wear debris: Rating = 100 |

Examples I and II show that compositions of the subject invention effectively prevent phonograph record groove wear as well as reduce the stylus groove friction. The compositions have been found to significantly retard wear over a large number of actual playings.

EXAMPLE III

A solution was prepared comprising 99.96% by weight of trichlorotrifluoroethane (Freon TF) and 0.04% by weight of perfluoroalkyl malonate, the perfluoroalkyl moiety average thereof ranging from heptyl to octyl. A clear, homogeneous solution resulted and was sprayed onto a clean phonograph test record, National Association of Broadcasters (NAB) test record No. 12-5-98, the trichlorotrifluoroethane was allowed to evaporate and the playing surface of the record was lightly buffed to leave a thin coating of diester thereon.

The stylus/groove coefficient of friction test was conducted in accordance with Example I. The stylus/groove coefficient of friction determined on the treated record was 0.18. In comparison, the coefficient of friction as determined on untreated NAB records averaged about 0.32.

The accelerated record wear test was also conducted on the treated record in accordance with Example II and resulted in the record having a very clean surface appearance indicating very little record wear and gave a relative rating of 1.0.

There has been disclosed herein a method of and a composition for lubricating surfaces, and in particular those surfaces which are capable of having or have dynamic presentations thereon. In view of this specification, those skilled in the art will have many modifications which fall within the true spirit and scope of this invention. It is intended that all such modifications be within the scope of the appended claims.

I claim:

1. A method of lubricating an encoded surface of closely spaced grooves, said method comprising the steps of applying to the closely spaced grooves a homogeneous solution comprising about 3 weight percent or less of a fluoroalkyl ester and an organic carrier having an effective penetrating coefficient, and removing the organic carrier therefrom whereby a lubricous coating is deposited on said surface, said fluoroalkyl ester being derived from an aliphatic alcohol having the general formula $C_nF_{2n+1}(CH_2)_mOH$ wherein n is from 3 to 14 and m is 1 to 3 and an aliphatic carboxylic acid having from 2 to about 30 carbon atoms, said carrier having a surface tension of about 20 dynes or less per centimeter at 20° C.

2. A method of claim 1 wherein the fluoroalkyl ester is a monoester derived from an aliphatic monocarboxylic acid.

3. A method of claim 1 wherein the fluoroalkyl ester is a diester derived from an aliphatic dicarboxylic acid.

4. A method of claim 1 wherein the fluoroalkyl ester is a triester derived from an aliphatic tricarboxylic acid.

5. A method of claim 1 wherein the fluoroalkyl ester is a tetraester derived from an aliphatic tetracarboxylic acid.

6. A method of lubricating and imparting wear resistance to the trackable grooves of a phonograph record comprising the steps of applying to the grooves of the phonograph record a clear, homogeneous solution comprising about 3 weight percent or less of a fluoroalkyl ester, said fluoroalkyl ester being derived from an aliphatic alcohol having the general formula $C_nF_{2n+1}(CH_2)_mOH$ wherein n is from 3 to 14 and m is 1 to 3 and an aliphatic carboxylic acid having from 2 to about 30 carbon atoms, and an organic carrier having an effective penetrating coefficient, said carrier having a surface tension of about 20 dynes or less per centimeter at 20° C., said organic carrier distributing the ester within the grooves of said record, removing the organic carrier therefrom to leave a deposit of said fluoroalkyl ester thereon ranging from about 0.3 to 3 micrograms per square centimeter, and buffing said grooves to a glossy finish.

7. A substrate having dynamic presentations in the form of closely spaced grooves thereon, said substrate having deposited within said closely spaced grooves a composition comprising a soluble fluoroalkyl ester, said fluoroalkyl ester being derived from an aliphatic alcohol having the general formula $C_nF_{2n+1}(CH_2)_mOH$ wherein n is from 3 to 14 and m is 1 to 3 and an aliphatic carboxylic acid having from 2 to about 30 carbon atoms, said ester being deposited within said grooves in a concentration of about 0.3 to about 3 micrograms per square centimeter.

8. A substrate of claim 7 wherein the fluoroalkyl ester is a monoester derived from an aliphatic monocarboxylic acid.

9. A substrate of claim 7 wherein the fluoroalkyl ester is a diester derived from an aliphatic dicarboxylic acid.

10. A substrate of claim 7 wherein the fluoroalkyl ester is a triester derived from an aliphatic tricarboxylic acid.

11. A substrate of claim 7 wherein the fluoroalkyl ester is a tetraester derived from an aliphatic tetracarboxylic acid.

12. A composition for imparting wear resistance to a grooved surface having dynamic presentations thereon comprising a clear, homogeneous solution of an essentially soluble, containing 3 weight percent or less nonvolatile fluoroalkyl ester, said fluoroalkyl ester being derived from an aliphatic alcohol having the general formula $C_nF_{2n+1}(CH_2)_mOH$ wherein n is from 3 to 14 and m is 1 to 3 and an aliphatic carboxylic acid having from 2 to about 30 carbon atoms, and a volatile organic carrier having an effective penetrating coefficient, said carrier having a surface tension of about 20 dynes or less per centimeter at 20° C.

13. A composition of claim 12 wherein said fluoroalkyl ester is a diester derived from an aliphatic dicarboxylic acid and a fluoroalcohol.

14. A composition of claim 12 wherein said fluoroalkyl ester is a triester derived from an aliphatic tricarboxylic acid and a fluoroalcohol.

15. A composition of claim 12 wherein said fluoroalkyl ester is a tetraester derived from an aliphatic tetracarboxylic acid and a fluoroalcohol.

16. A composition for imparting wear resistance and low friction characteristics to a grooved surface comprising a solution containing 3 weight percent or less of an essentially soluble, nonvolatile fluoroalkyl ester and a volatile halogenated hydrocarbon carrier having an effective penetrating coefficient, said fluoroalkyl ester being derived from an aliphatic alcohol having the general formula $C_nF_{2n+1}(CH_2)_mOH$ wherein n is from 3 to 14 and m is 1 to 3 and an aliphatic carboxylic acid having from 2 to about 30 carbon atoms.

17. The composition of claim 16 wherein the halogenated hydrocarbon has one to six carbon atoms.

18. A composition of claim 16 wherein the fluoroalkyl ester in solution is from about 0.2 to about 0.01 weight percent.

19. A composition of claim 16 wherein the fluoroalkyl ester in solution is from about 0.1 to about 0.03 weight percent.

20. A composition of matter as recited in claim 16 wherein said halogenated hydrocarbon is selected from the group consisting of trichlorotrifluoroethane, perfluorodimethylcyclobutane, carbon tetrachloride, chloroform, methylene chloride, methyl chloroform, tetrachloroethylene, trichloroethylene, dichloroethane and dichloroethylene.

* * * * *